(12) United States Patent
Ikeda et al.

(10) Patent No.: US 12,556,081 B2
(45) Date of Patent: Feb. 17, 2026

(54) ELECTRIC POWER CONVERSION DEVICE AND CONTROL METHOD FOR ELECTRIC POWER CONVERSION DEVICE

(71) Applicant: KABUSHIKI KAISHA YASKAWA DENKI, Fukuoka (JP)

(72) Inventors: Kazumasa Ikeda, Fukuoka (JP); Takahiro Saeki, Fukuoka (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 217 days.

(21) Appl. No.: 18/551,127

(22) PCT Filed: Mar. 23, 2021

(86) PCT No.: PCT/JP2021/012063
§ 371 (c)(1),
(2) Date: Sep. 18, 2023

(87) PCT Pub. No.: WO2022/201328
PCT Pub. Date: Sep. 29, 2022

(65) Prior Publication Data
US 2024/0162799 A1    May 16, 2024

(51) Int. Cl.
*H02M 1/084* (2006.01)
*H02M 1/00* (2006.01)
(Continued)

(52) U.S. Cl.
CPC ....... *H02M 1/0067* (2021.05); *H02M 1/0845* (2013.01); *H02M 7/493* (2013.01); *H02P 27/085* (2013.01)

(58) Field of Classification Search
CPC ............ H02M 1/0012; H02M 1/0845; H02M 1/0067; H02M 1/007; H02M 1/0074;
(Continued)

(56) References Cited

U.S. PATENT DOCUMENTS

| 2015/0180535 | A1* | 6/2015 | Yamaoka | H04B 3/145 323/265 |
| 2021/0050728 | A1* | 2/2021 | Brombach | H02J 3/32 |
| 2022/0399831 | A1* | 12/2022 | Ido | H02M 1/0003 |

FOREIGN PATENT DOCUMENTS

| JP | 2005-130599 A | 5/2005 |
| JP | 2015-130746 A | 7/2015 |

(Continued)

OTHER PUBLICATIONS

Notice of Reasons for Refusal issued in corresponding Japanese Application No. 2023-508231 mailed Jun. 25, 2024 (6 pages).

*Primary Examiner* — Alex Torres-Rivera
(74) *Attorney, Agent, or Firm* — Osha Bergman Watanabe & Burton LLP

(57) ABSTRACT

To provide an electric power conversion device that carries out high-speed transmission of current values of a plurality of inverters, and a control method for the electric power conversion device. The electric power conversion device includes a main controller, a plurality of subcontrollers, and a relay unit. The main controller generates and outputs a control command that is a target value for controlling electric power conversion carried out by a plurality of electric power conversion units that supply and receive power to and from a load based on state quantity information related to a state quantity of each of the plurality of electric power conversion units. The subcontrollers are provided for each of the electric power conversion units to control the electric power conversion units based on the control command and to acquire and output the state quantities. The relay unit compresses information of the state quantities output from subcontrollers.

11 Claims, 11 Drawing Sheets

(51) Int. Cl.
*H02M 7/493* (2007.01)
*H02P 27/08* (2006.01)
(58) Field of Classification Search
CPC .. H02M 1/0077; H02M 1/008; H02M 3/1584;
H02M 7/4835; H02M 7/49
See application file for complete search history.

(56) References Cited

FOREIGN PATENT DOCUMENTS

JP           6755436 B1   9/2020
WO     2014/025734 A2   2/2014

\* cited by examiner

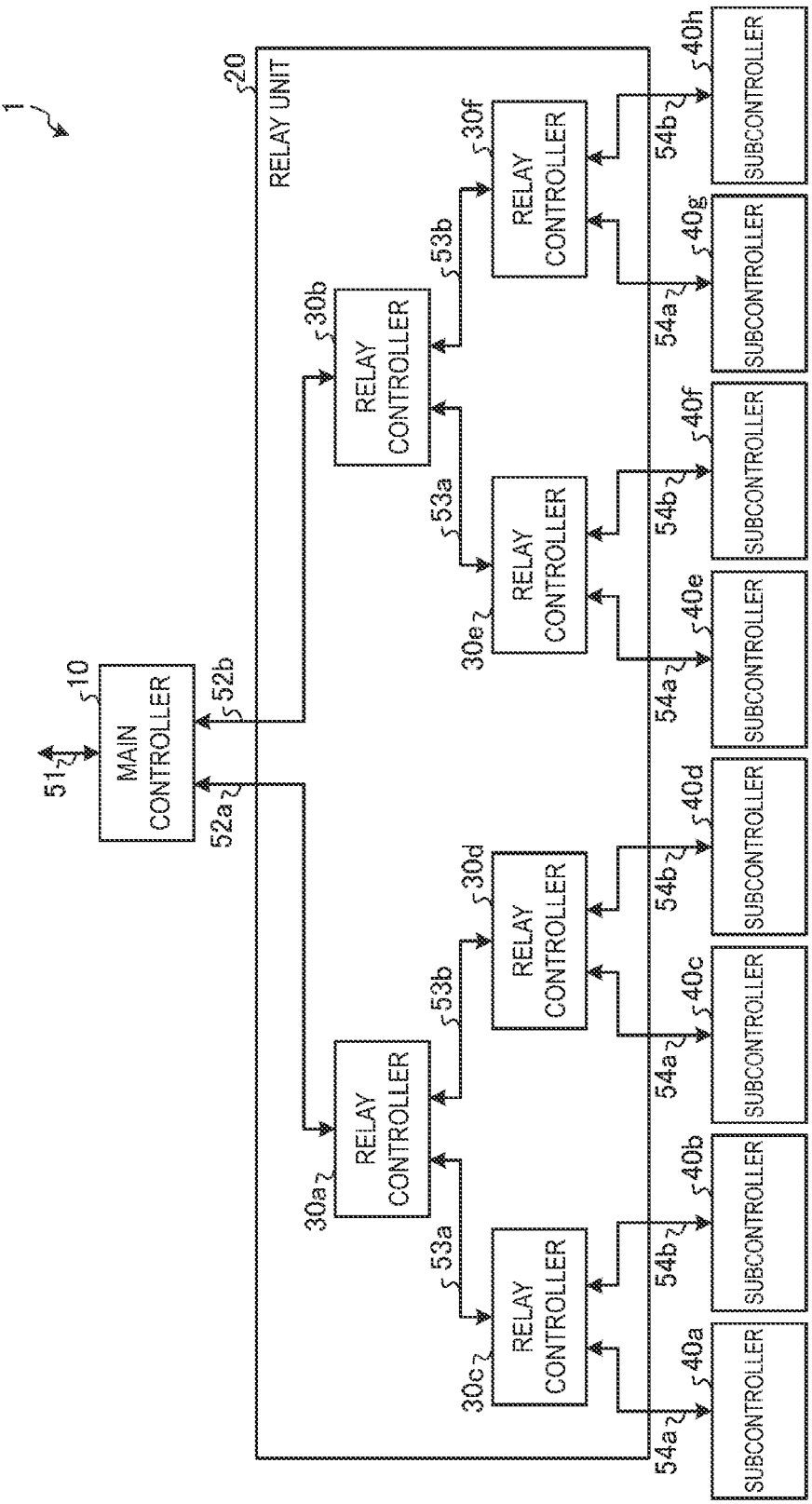
[FIG. 1]

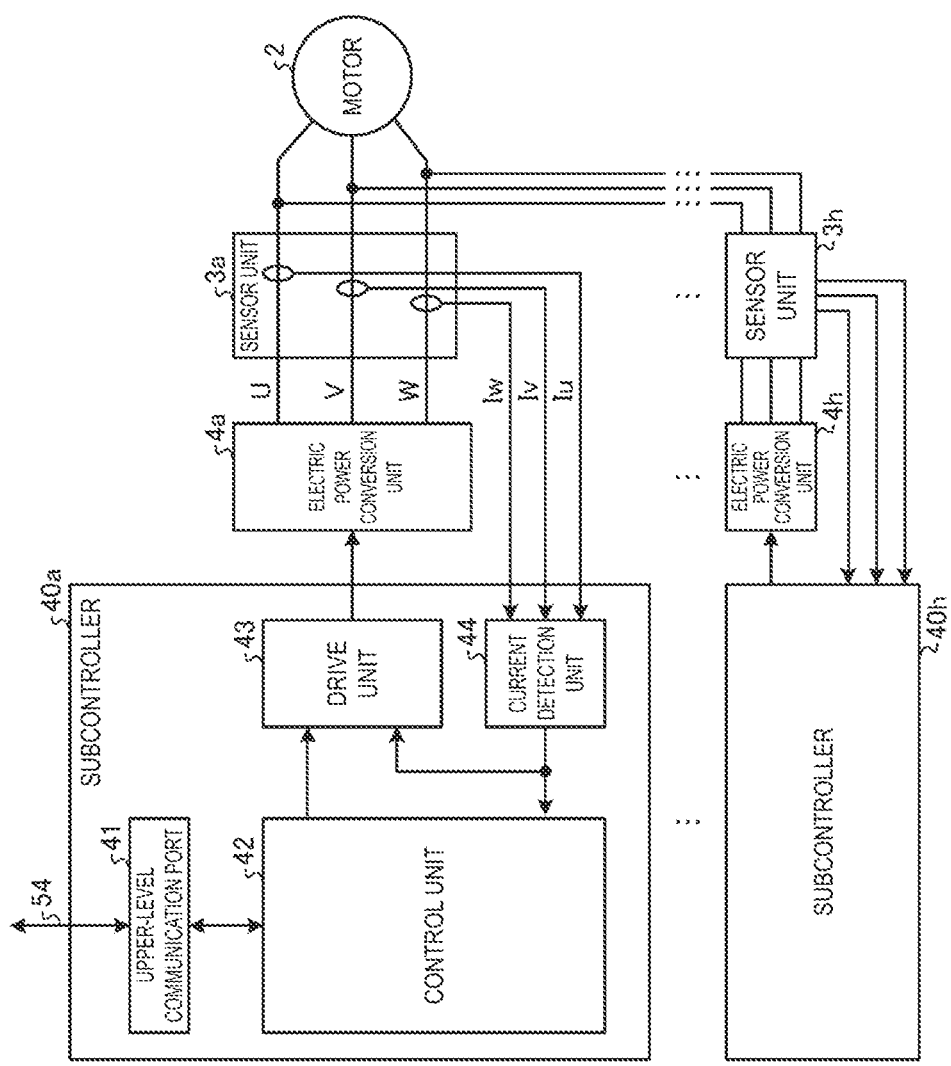
[FIG. 2]

[FIG. 3]
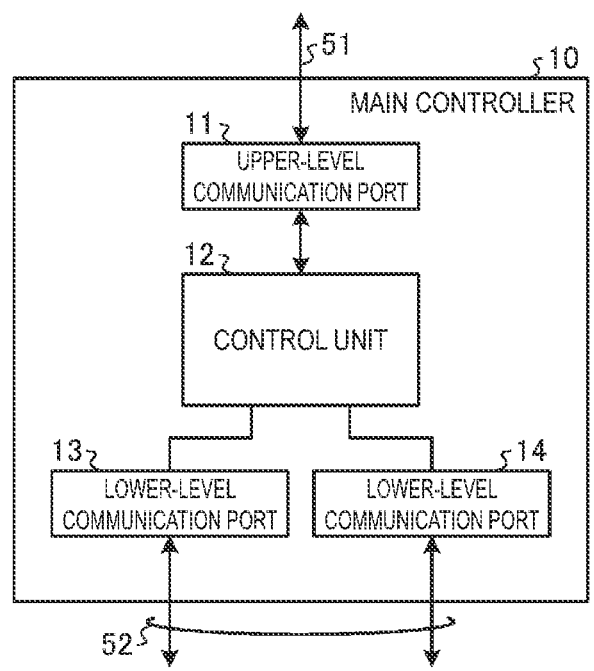
[FIG. 4]
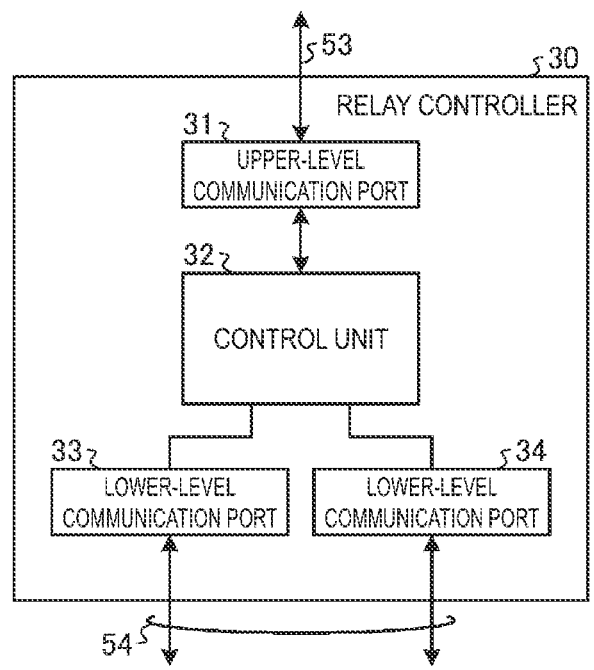

[FIG. 5A]
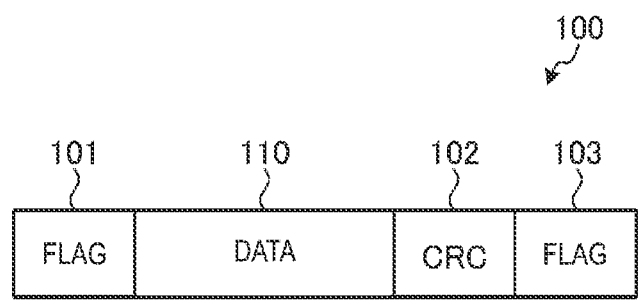
[FIG. 5B]
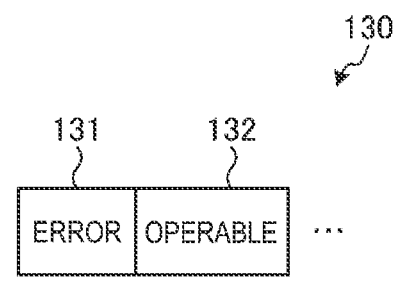

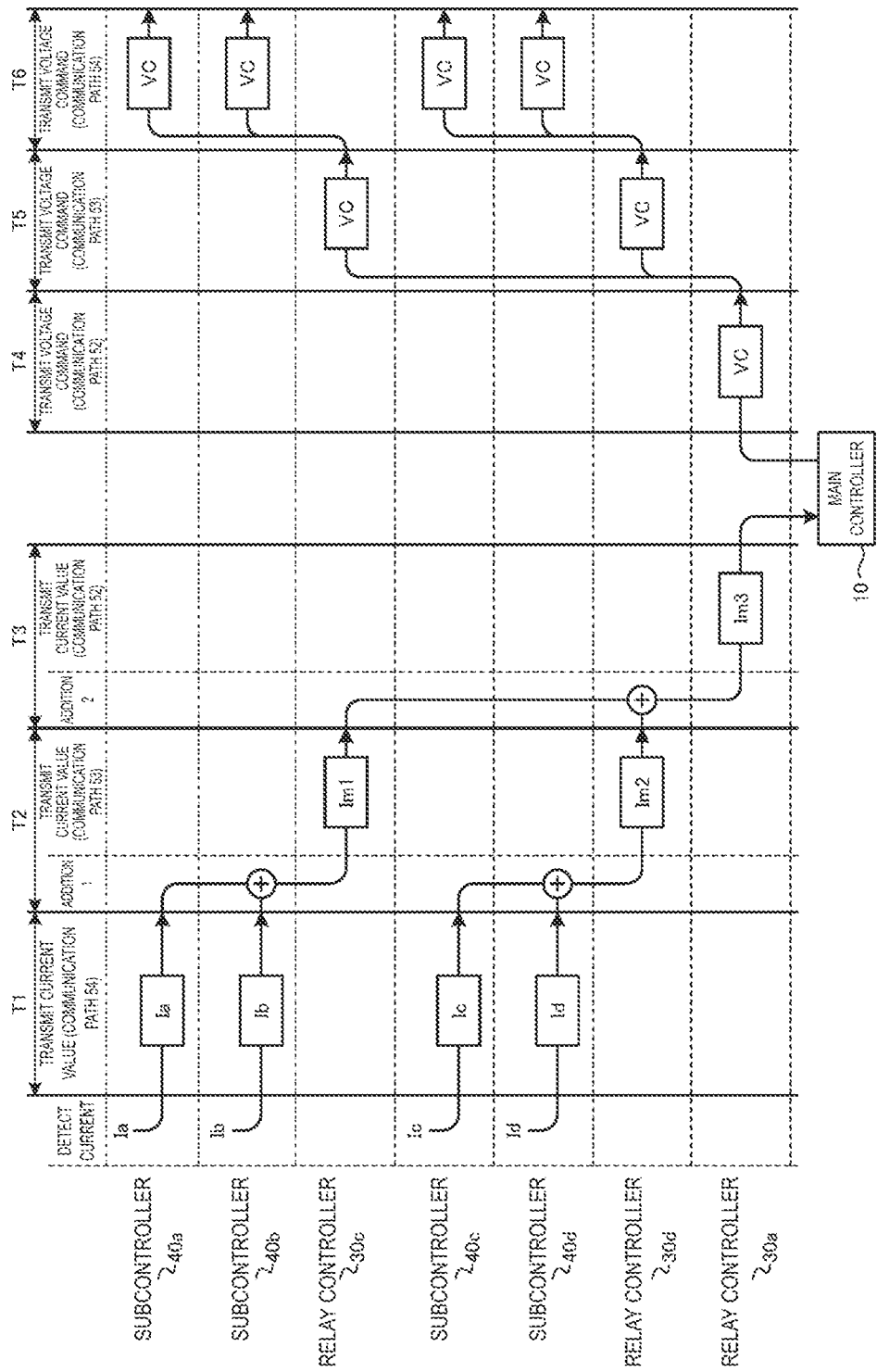
[FIG. 6]

[FIG. 7A]
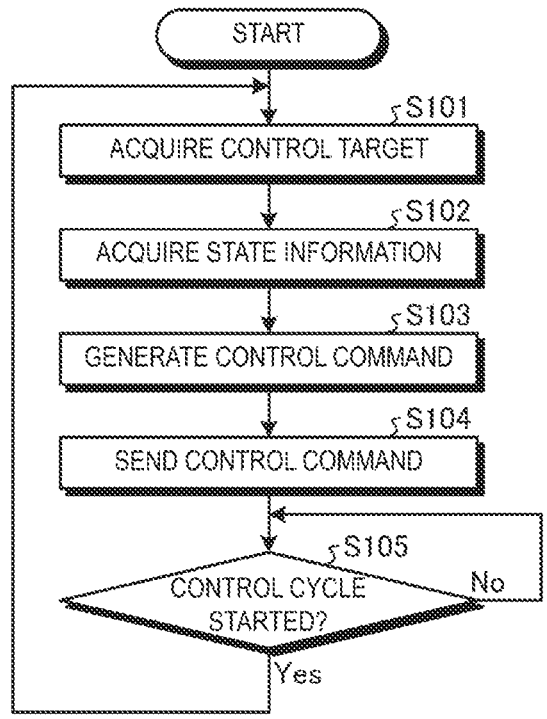
[FIG. 7B]
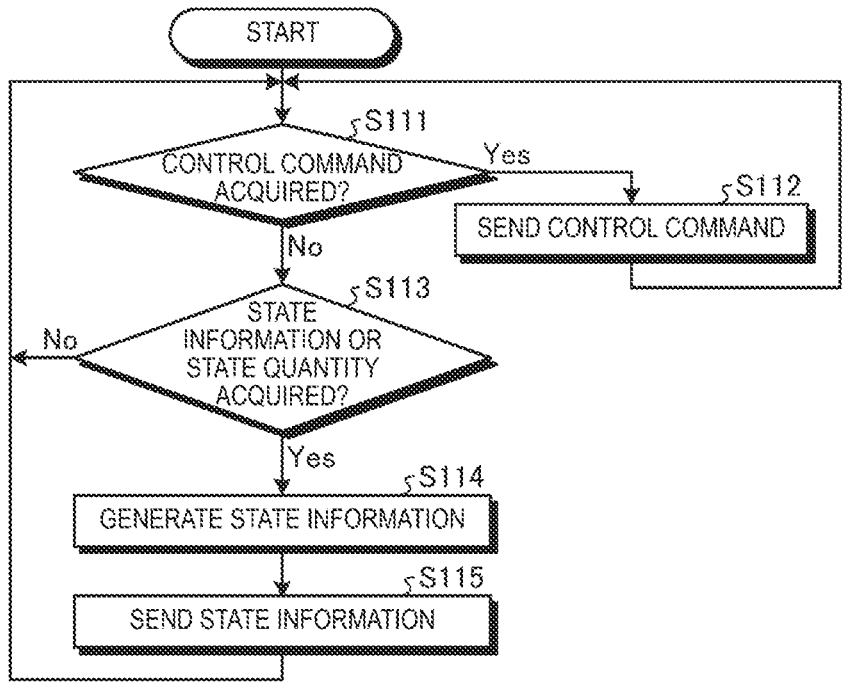

[FIG. 7C]
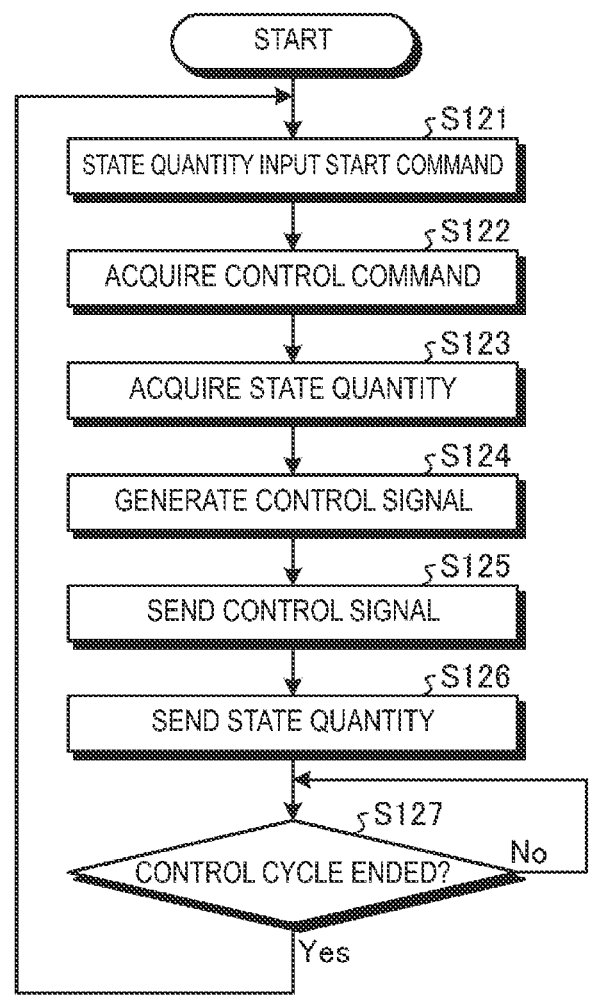

[FIG. 8]
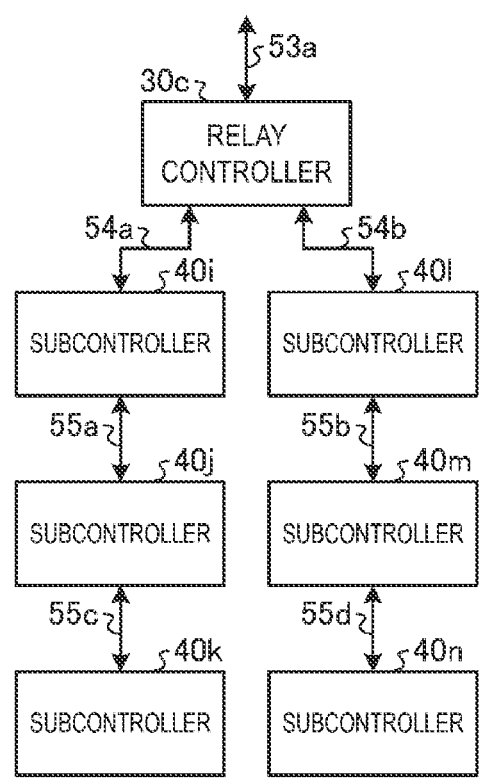

[FIG. 9]
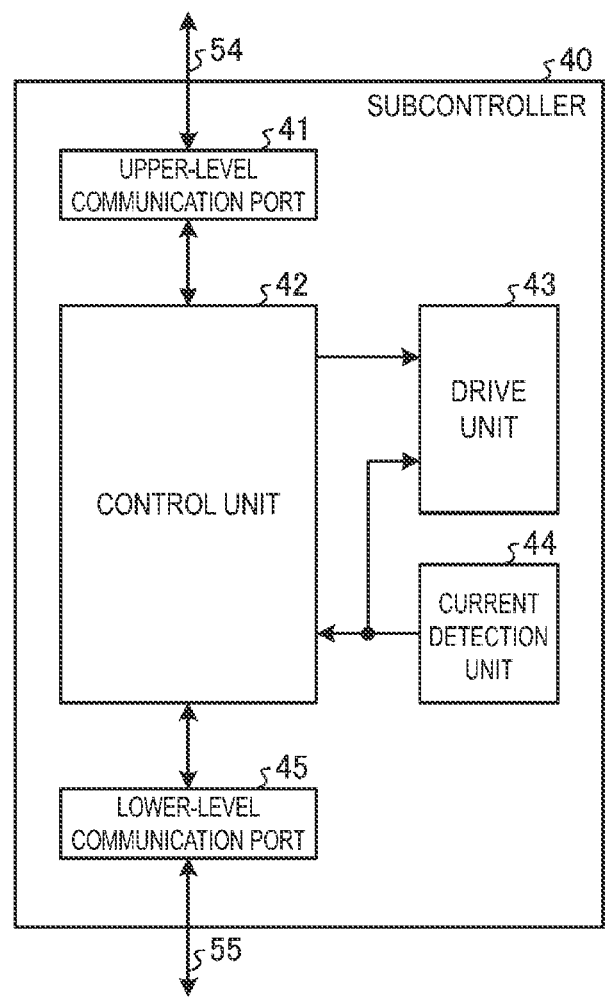

[FIG. 10]
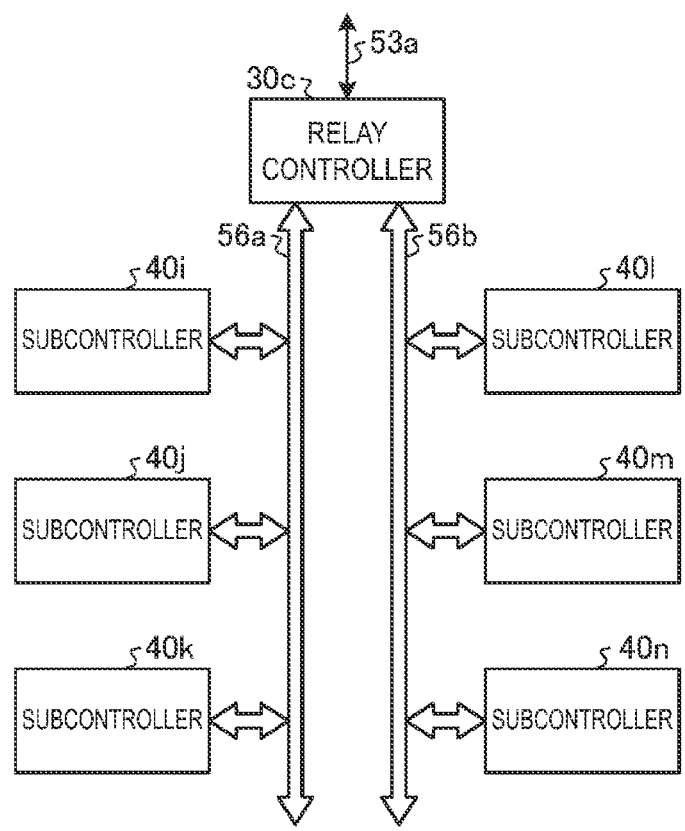

[FIG. 11A]
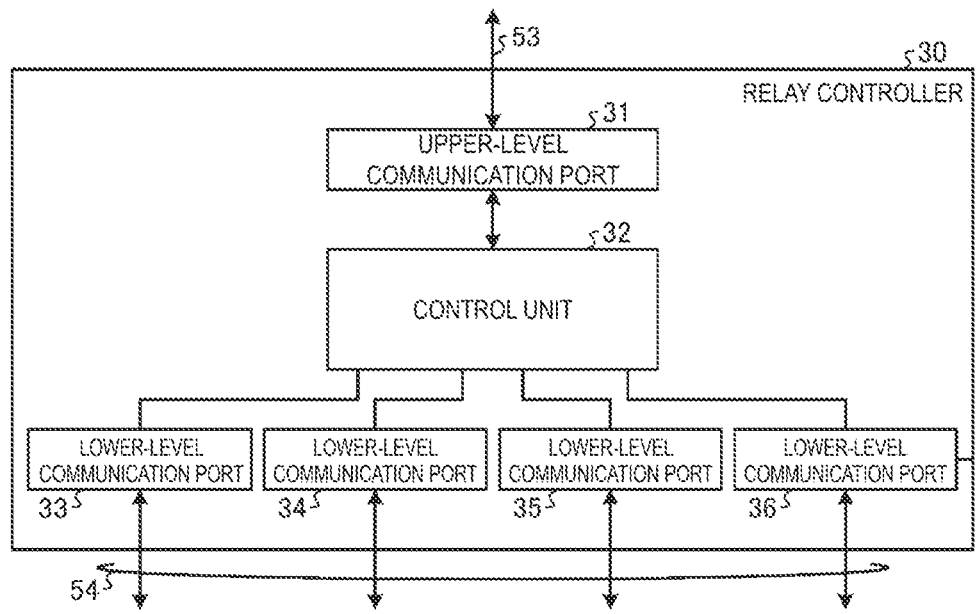
[FIG. 11B]
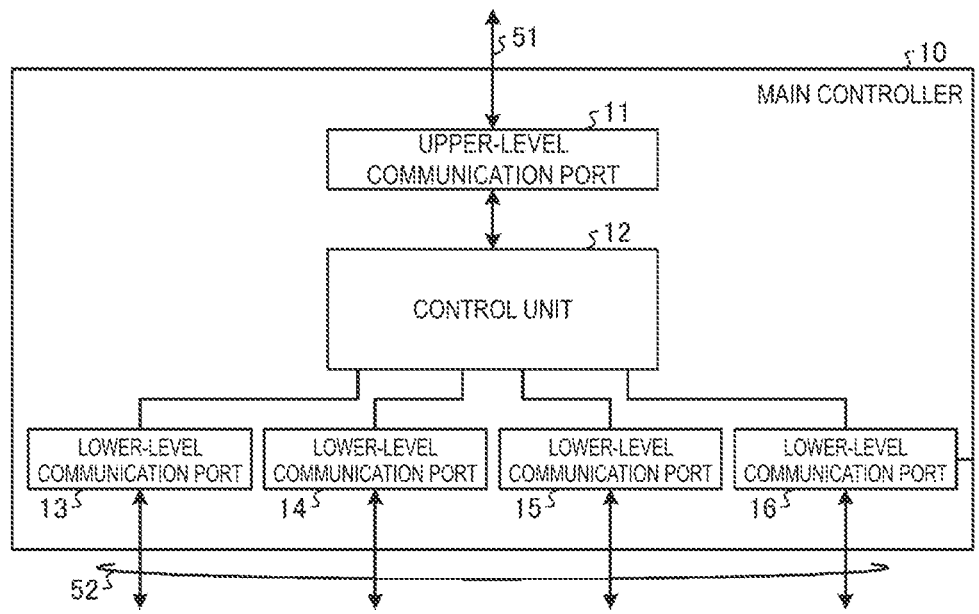

ELECTRIC POWER CONVERSION DEVICE AND CONTROL METHOD FOR ELECTRIC POWER CONVERSION DEVICE

TECHNICAL FIELD

Embodiments of the disclosure relate to an electric power conversion device and a control method for the electric power conversion device.

BACKGROUND ART

A system for driving a motor or the like by a plurality of inverters has been known.

For example, a proposed system includes a plurality of inverters and a plurality of auxiliary power supplies, which perform single power supply to the inverters, that are provided and connected in parallel to allow feedback control of current at each inverter based on a sum of the currents of the inverters (see, for example, Patent Document 1).

CITATION LIST

Patent Literature

Patent Document 1. JP 2005-130599 A

SUMMARY OF INVENTION

Technical Problem

However, in the above-mentioned related art, a central device for transmission control calculates both a sum and an average value of output current vectors representing the current at the inverters and feeds them back to each inverter. In this case, as the number of inverters increase, it takes more time to transmit the output current vectors.

In one aspect, an embodiment aims to provide an electric power conversion device that carries out high-speed transmission of state quantities of a plurality of inverters, and a control method for the electric power conversion device.

Solution to Problem

An electric power conversion device according to an aspect of an embodiment includes a main controller, a plurality of subcontrollers, and a relay unit. The main controller generates and outputs a control command that is a target value for controlling electric power conversion carried out by a plurality of electric power conversion units that supply and receive power to and from a load based on state quantity information related to a state quantity of each of the plurality of electric power conversion units. The subcontrollers are provided for each of the electric power conversion units to control the electric power conversion units based on the control command and to acquire and output the state quantities. The relay unit compresses information of the state quantities output from the plurality of subcontrollers to generate the state quantity information, and transmits the state quantity information to the main controller side.

A control method for an electric power conversion device according to an aspect of an embodiment includes generating and outputting a control command that is a target value for controlling electric power conversion carried out by a plurality of electric power conversion units that supply and receive power to and from a load using state quantity information related to a state quantity of each of the plurality of electric power conversion units, controlling the electric power conversion units based on the control command for each of the electric power conversion units, and acquiring and outputting the state quantities, and compressing information of a plurality of the output state quantities to generate the state quantity information, and using the state quantity information for the generation of the control command.

Advantageous Effects of Invention

According to the one aspect of the embodiment, the electric power conversion device that can carry out high-speed transmission of state quantities of the plurality of inverters, and the control method for the electric power conversion device are provided.

BRIEF DESCRIPTION OF DRAWINGS

FIG. 1 illustrates a configuration example of an electric power conversion device according to a first embodiment.

FIG. 2 illustrates a configuration example of a subcontroller according to the first embodiment.

FIG. 3 illustrates a configuration example of a main controller according to the first embodiment.

FIG. 4 illustrates a configuration example of a relay controller according to the first embodiment, FIG. 5A illustrates a configuration example of communication data according to the first embodiment.

FIG. 5B illustrates an example of a status.

FIG. 6 illustrates an example of transmission of communication data according to the first embodiment.

FIG. 7A illustrates an example of a control method for the main controller according to the first embodiment.

FIG. 7B illustrates an example of a control method for the relay controller according to the first embodiment.

FIG. 7C illustrates an example of a control method for the subcontroller according to the first embodiment.

FIG. 8 illustrates a configuration example of an electric power conversion device according to a second embodiment, FIG. 9 illustrates a configuration example of a subcontroller according to the second embodiment.

FIG. 10 illustrates another configuration example of the electric power conversion device according to the second embodiment.

FIG. 11A illustrates a configuration example of a relay controller according to a third embodiment.

FIG. 11B illustrates a configuration example of a main controller according to the third embodiment.

DESCRIPTION OF EMBODIMENTS

Embodiments of the present disclosure will be described in detail below with reference to the accompanying drawings. Note that this invention is not limited to the embodiments described below. In the following embodiments, the same portions are denoted by the same reference signs, and redundant description will be omitted.

First Embodiment

Configuration of Electric Power Conversion Device

FIG. 1 illustrates a configuration example of an electric power conversion device according to a first embodiment. This drawing is a block diagram illustrating a configuration example of an electric power conversion device 1. The electric power conversion device 1 is configured to control a plurality of electric power conversion units (electric power conversion units 4 which will be described later) that supply power to a load such as a motor. The electric power conversion device 1 is controlled by an upper-level control device to carry out the control mentioned above. The upper-level control device corresponds to, for example, a control device that controls the entire system.

The electric power conversion device 1 includes a main controller 10, a relay unit 20, and a plurality of subcontrollers 40. The electric power conversion device 1 illustrated in this drawing is an example including eight subcontrollers (subcontroller 40*a* to subcontroller 40*h*).

The main controller 10 is connected to the upper-level control device via a communication path 51. The main controller 10 is connected to the relay unit 20 via communication paths 52. In the example of this drawing, the main controller 10 is connected to the relay unit 20 via communication paths 52*a* and 52*b*.

The relay unit 20 is connected to the subcontrollers 40 via communication paths 54. In the example of this drawing, the relay unit 20 is connected to the subcontrollers 40*a* to 40*h* via a plurality of communication paths 54*a* and 54*b*.

As illustrated in this drawing, the relay unit 20 includes relay controllers 30. The relay unit 20 illustrated in this drawing is an example in which a plurality of relay controllers 30 are connected in a tree-like manner. The relay unit 20 illustrated in this drawing includes six relay controllers 30 connected in a tree-like manner in two stages.

Each relay controller 30 can be connected to a device on the main controller 10 side via one communication path, and connected to a plurality of devices on the subcontrollers 40 side via respective communication paths. Thus, the relay controllers 30 can be connected in a tree-like manner. Each relay controller 30 illustrated in this drawing is an example connected to two devices on the subcontroller 40 side.

Specifically, the relay controller 30*a* in the first stage of the relay unit 20 is connected to the main controller 10 via the communication path 52*a*, and is connected to relay controllers 30*c* and 30*d* via communication paths 53*a* and 53*b*, respectively. The relay controller 30*b* in the first stage of the relay unit 20 is similarly connected.

The relay controller 30*c* in the second stage of the relay unit 20 is connected to the relay controller 30*a* mentioned above via the communication path 53*a* mentioned above, and is connected to the subcontrollers 40*a* and 40*b* via the communication paths 54*a* and 54*b*, respectively. The relay controller 30*d* in the second stage of the relay unit 20 is similarly connected.

The relay controller 30*e* in the second stage of the relay unit 20 is connected to the relay controller 30*b* mentioned above via the communication path 53*a* mentioned above, and is connected to the subcontrollers 40*e* and 40*f* via the communication paths 54*a* and 54*b*, respectively. The relay controller 30*f* in the second stage of the relay unit 20 is similarly connected.

Communication paths capable of serial communication can be used for the communication paths 51, 52, 53, and 54. In this case, the communication paths 52 and the like can be made of a full-duplex communication path and a half-duplex communication path.

Configuration of Subcontrollers

FIG. 2 illustrates a configuration example of subcontrollers according to the first embodiment. This drawing is a block diagram illustrating a configuration example of the subcontrollers 40. In addition to the subcontrollers 40, this drawing also illustrates a motor 2, electric power conversion units 4, and sensor units 3. The electric power conversion units 4 illustrated in this drawing supply power to the motor 2. The subcontrollers 40 control the electric power conversion units 4.

This drawing illustrates an example in which a plurality of electric power conversion units 4*a* to 4*h* connected in parallel, similarly to FIG. 1, are connected to the motor 2. In this drawing, one motor 2 is driven by the plurality of electric power conversion units 4*a* to 4*h*. The subcontrollers 40*a* to 40*h* and the sensor units 3*a* to 3*h* are provided respectively for each of the electric power conversion units 4*a* to 4*h*.

For example, a three-phase induction motor can be applied to the motor 2. Each electric power conversion unit 4 can be provided using a circuit including a plurality of switch elements connected in a three-phase bridge connection. Each electric power conversion unit 4 is connected to the motor 2 via U-phase, V-phase, and W-phase lines to convert direct-current power supplied from a power supply unit which is not illustrated into alternating-current power, thus supplying the alternating-current power to the motor 2. The alternating current supplied to the motor 2 is subjected to pulse width modulation (PWM) control for adjustment of the power. This controls the rotational speed, torque, and the like of the motor 2. The subcontrollers 40 carry out the PWM control, and the electric power conversion units 4 supply the alternating-current power to the motor 2 in response to PWM control signals from the subcontrollers 40 in accordance with the PWM control.

The subcontrollers 40 detect a state quantity of the motor 2. The state quantity is assumed to be a current value of the current flowing through the motor 2. In this case, the control command corresponds to a voltage command. The subcontrollers 40 receive the voltage command via the communication paths 54, generate the PWM control signal corresponding to the voltage command, and output the PWM control signal to the electric power conversion units 4. The subcontrollers 40 may correct the voltage command based on the detected current value of the current flowing through the motor 2 and generate the PWM control signal corresponding to the corrected voltage command. For example, the subcontrollers 40 may receive the current command used to generate the voltage command, together with the voltage command, via the communication paths 54, and correct the voltage command based on the current command and the detected current value of the current flowing through the motor 2. The PWM control signal is input to a switch element of each electric power conversion unit 4, such as to a gate terminal of an IGBT. In this way, the subcontrollers 40 drive the switch elements of the electric power conversion units 4 with the PWM signal corresponding to the voltage command, and cause the electric power conversion units 4 to generate the output voltage corresponding to the voltage command. As a result, the subcontrollers 40 control electric power conversion in the electric power conversion units 4 to allow required power to be supplied to the motor 2. The voltage command is generated by the main controller 10.

The sensor units 3 respectively detect the line current of the U-phase, V-phase, and the W-phase lines of each electric power conversion unit 4. The sensor units 3 are provided for each of the electric power conversion units 4, composed of three current sensors corresponding to the U-phase, V-phase, and W-phase lines, respectively. Sensors using a current transformer or a Hall element can be used for the current sensors. Such current sensors output analog signals corresponding to the line current. The current detected by the sensor units 3 is transmitted to the subcontrollers 40 through signal lines Iu, Iv, and Iw corresponding to the U-phase, V-phase, and W-phase lines, respectively. The current sensors may not be provided for all three phases of the U-phase, V-phase, and W-phase lines. The current sensors may be provided for only two phases on the assumption that the current sum of the three phases is zero, and the current of the remaining phase can be obtained by calculation from the two line currents detected by the current sensors.

The subcontrollers 40 illustrated in this drawing each include an upper-level communication port 41, a control unit 42, a drive unit 43, and a current detection unit 44.

The upper-level communication port 41 communicates with the relay controller 30 provided as an upper-level device. The upper-level communication port 41 is connected to the relay controller 30 via the communication path 54. The upper-level communication port 41 receives the control command or the like transmitted from the relay controllers 30, and transmits a state quantity or a status to the relay controller 30.

The control unit 42 controls data transmission and reception at least in the subcontroller 40. Specifically, the control unit 42 outputs the control command received from the upper-level communication port 41 via the communication path 54 to the drive unit 43, and transmits the current value detected by the current detection unit 44 as the state quantity from the upper-level communication port 41 via the communication path 54. The control unit 42 also generates a status and transmits it from the upper-level communication port 41 via the communication path 54.

The drive unit 43 drives the electric power conversion unit 4. The drive unit 43 generates a control signal for the electric power conversion unit 4 based on the control command output from the control unit 42. For example, the drive unit 43 compares the control command with a triangular wave to generate the PWM control signal, and outputs it to the electric power conversion unit 4. Alternatively, the control unit 42 may generate the PWM control signal by a space vector control method. The control unit 42 may also set the current value detected by the current detection unit 44 as the state quantity, correct the control command based on the state quantity, and generate the PWM control signal based on the corrected control command.

The current detection unit 44 outputs the current value output from the sensor unit 3 as the state quantity to the drive unit 43 and the control unit 42. The current detection unit 44 includes an analog-to-digital converter to convert an analog current value output from the sensor unit 3 into a digital current value, and outputs the digital current value to the drive unit 43 and the control unit 42.

The control unit 42, the drive unit 43, and the current detection unit 44 may have different configurations and processing contents for each of the subcontrollers 40a to 40h, on the condition that the state quantity is detected, the detected state quantity is sent from the upper-level communication port 41, and the detected state quantity is received from the upper-level communication port 41.

Configuration of Main Controller

FIG. 3 illustrates a configuration example of a main controller according to the first embodiment. This drawing is a block diagram illustrating a configuration example of the main controller 10. The main controller 10 illustrated in this drawing includes an upper-level communication port 11, a control unit 12, and lower-level communication ports 13 and 14.

The upper-level communication port 11 communicates with an upper-level control device. The upper-level communication port 11 is connected to the communication path 51.

The lower-level communication ports 13 and 14 communicate with devices which are lower-level devices on the subcontroller 40 side. The lower-level communication ports 13 and 14 are connected to the relay controllers 30 via different communication paths 52. The lower-level communication ports 13 and 14 transmit control commands and receive state quantities and statuses from the relay controllers 30.

The control unit 12 controls at least generation of the control command and also data transmission and reception in the main controller 10, Specifically, the control unit 12 generates a control command for the electric power conversion units 4 based on the state quantity of each of the electric power conversion units 4 driven by the subcontrollers 40. For example, the control unit 12 acquires a control target received from an upper-level control device via the communication path 51 or input from an IO device (not illustrated) attached to the main controller 10. The control target corresponds to, for example, a speed command or a torque command for the motor 2. The control unit 12 generates a target value of the state quantity from the control target. It is assumed that a current command is provided as the target value of the state quantity.

The control command is generated as the target value for controlling electric power conversion carried out by the electric power conversion units 4 based on the current command and a sum of the plurality of current values, which are provided as a plurality of state quantities detected by the plurality of subcontrollers 40. The control command corresponds to, for example, a voltage command. Generation of the control command includes, for example, generation of a voltage target based on the current command according to the vector control of the alternating current motor, and generation of a voltage command by correction of the voltage target based on a difference value between the current command and a sum of the plurality of current values. The control unit 12 carries out feedback control by outputting the voltage command, which is the control command, to the subcontrollers 40 side. The control command generated by the main controller 10 and transmitted via the relay controllers 30 updates the control command of the drive unit 43.

The lower-level communication ports 13 and 14 receive the state quantities from the respective relay controllers 30. The control unit 12 adds these state quantities to generate the sum of the state quantities described above.

The relay controllers 30 are disposed between the main controller 10 and the subcontrollers 40. The state quantities from the subcontrollers 40 are transmitted to the main controller 10 via the relay controllers 30. At this time, the relay controllers 30 can generate state quantity information obtained by compressing information of the plurality of state quantities and transmit the state quantity information to the main controller 10. As will be described later, this information compression can be carried out by addition of the state quantities. When the state quantity information is transmitted from the lower-level relay controllers 30, the relay controllers 30 further compresses information of the state quantity information. This can be done by adding the state quantity information. The addition of the state quantities and the state quantity information is an example of information compression in the relay controllers 30.

In this case, the main controller 10 generates the control command based on the state quantity information related to the state quantities. Specifically, the main controller 10 can add the state quantity information from the plurality of relay controllers 30 to generate the sum of the state quantities. Details of the state quantity information will be described later.

Configuration of Relay Controllers

FIG. 4 illustrates a configuration example of the relay controller according to the first embodiment. This drawing is a block diagram illustrating a configuration example of the relay controller 30. The relay controller 30 illustrated in this drawing includes an upper-level communication port 31, a control unit 32, and lower-level communication ports 33 and 34.

The upper-level communication port 31 is configured to communicate with the main controller 10, which is the upper-level device, and one of the relay controllers 30 on the main controller 10 side. The relay controller 30 illustrated in this drawing is an example connected to the relay controller 30 on the main controller 10 side. The upper-level communication port 31 illustrated in this drawing is connected to the communication path 53. The upper-level communication port 31 transmits the state quantity information and the status, and receives the control command.

The lower-level communication ports 33 and 34 communicate with the subcontrollers 40, which are lower-level devices, and one of the relay controllers 30 on the subcontrollers 40 side. The lower-level communication ports 33 and 34 illustrated in this drawing are connected to the subcontrollers via different communication paths 54. The lower-level communication ports 33 and 34 transmit the control command, and receive the state quantity, or the state quantity information, and the status.

The control unit 32 controls at least the generation of the state quantity information and also data transmission and reception in the relay controllers 30. Specifically, the control unit 32 transmits the control command received at the upper-level communication port 31 from the main controller 10 side to the subcontroller 40 side via the lower-level communication ports 33 and 34. The control unit 32 also compresses information. When the lower-level communication ports 33 and 34 are connected to the subcontrollers 40, the control unit 32 compresses information of the received state quantities to generate state quantity information. When the lower-level communication ports 33 and 34 are connected to the relay controllers 30, the control unit 12 further compresses the received state quantity information to generate new state quantity information.

The control unit 32 can compress information by adding a plurality of state quantities input to itself. In this case, the state quantity information generated by the information compression corresponds to the sum of the plurality of state quantities input to itself. The control unit 32 can also compress information of the state quantity information by adding a plurality of pieces of state quantity information input to itself and generating new state quantity information.

In addition, the control unit 32 can aggregate the statuses received at the lower-level communication ports 33 and 34 to generate a new status, and transmit the new status from the upper-level communication port 31. The aggregation of statuses will be described in detail later.

Data Configuration

FIG. 5A illustrates an example of communication data according to the first embodiment. This drawing illustrates an example of communication data 100 transmitted through the communication paths 52 to 54. The communication data 100 represents an example corresponding to the serial communication. The communication data 100 includes a flag 101, data 110, CRC 102, and a flag 103.

The flag 101 represents the start of communication data. The flag 103 represents the end data of communication data. The data 110 is the body of data transmitted by the communication data 100. The CRC 102 is a code for detecting an error in data by cyclic redundancy check (CRC).

The data 110 in the communication data 100 transmitted from the main controller 10 side includes a control command 111. Alternatively, a command may be configured to represent an instruction to the subcontroller 40 or the like, or an address of the subcontroller 40 or the like.

The data 110 in the communication data 100 transmitted from the subcontrollers 40 includes a state quantity 121 and a status 130. The state quantity 121 corresponds to a current value of the electric power conversion unit 4 of each subcontroller 40. In the case of the data 110 in the communication data 100 transmitted from the relay controller 30, the state quantity information is disposed instead of the state quantity 121.

FIG. 5B illustrates an example of the status. This drawing illustrates an example of a status 130. The status 130 illustrated in this drawing is an example composed of a plurality of status bits. The status 130 illustrated in this drawing includes an error status 131 and an operable status 132 as the status bits. The error status 131 is the status bit indicating a state in which an error has occurred in the subcontroller 40 or the like. For example, the error status 131 can be set to a value "1" when the error occurs. The error status 131 may be composed of a plurality of status bits indicating a state in which an error has occurred for each of a plurality of error items. The operable status 132 is the status bit indicating the operable state of the subcontroller 40. For example, the operable status 132 can be set to a value "1" during the operable state.

As described above, the relay controller 30 aggregates two statuses received at the lower-level communication ports 33 and 34 and generates a new status. This aggregation can be carried out as follows. In the error status 131, the error statuses 131 of the two statuses 130 are subjected to the logical OR operation to generate a new 1-bit error status 131. When at least one error status 131 of the two statuses 130 is in the state in which the error has occurred (value "1"), the error state can be transmitted to the main controller 10 side.

On the other hand, in the operable status 132, the operable statuses 132 of the two statuses 130 are subjected to the logical AND operation to generate a new 1-bit operable status 132. When the operable statuses 132 of the two statuses 130 are both in the operable state (value "1"), the operable state can be transmitted to the main controller 10 side. In this way, the aggregation method corresponding to the status bit can be applied.

Transmission of Communication Data

FIG. 6 illustrates an example of transmission of the communication data according to the first embodiment. This drawing illustrates transmission of the state quantities from the subcontrollers 40 to the main controller 10 and transmission of the state quantity command from the main controller 10 to the subcontrollers 40 which are illustrated in FIG. 1. This drawing also illustrates how the state quantities and the like are transmitted among the relay controllers 30. This drawing represents an excerpt of FIG. 1, illustrating the main controller 10, the relay controllers 30a, 30c, and 30d, and the subcontrollers 40a to 40d.

In this drawing, the "subcontroller 40a", "subcontroller 40b", and relay controller 30c" respectively represent the communication data transmitted and received by the subcontroller 40a, subcontroller 40b, and relay controller 30c. Also, the "subcontroller 40c", "subcontroller 40d", and "relay controller 30d" respectively represent the communication data transmitted and received by the subcontroller 40c, subcontroller 40d, and relay controller 30d. In addition, the "relay controller 30a" represents the communication data transmitted and received by the relay controller 30a.

T1, T2, T3, T4, T5, and T6 represent communication periods. T1, T2, and T3 are communication periods for the transmission of the state quantities from the subcontrollers 40 to the main controller 10. T4, T5, and T6 are communication periods for the transmission of the state quantity command or the like from the main controller 10 to the subcontrollers 40. In this drawing, it is assumed that the current value is the state quantity and the voltage command is the state quantity command.

First, the subcontrollers 40a to 40d detect current values corresponding to the state quantities of the electric power conversion units 4. In this drawing, Ia, Ib, Ic, and Id represent detected current values of the subcontrollers 40a, 40b, 40c, and 40d, respectively.

In the communication period T1, the subcontrollers 40a to 40d transmit the current values via the communication paths 54. The subcontrollers 40a and 40b transmit the current values to the relay controller 30c. The subcontrollers 40c and 40d transmit the current values to the relay controller 30d.

In the communication period T2, the relay controller 30c adds the transmitted current values Ia and Ib (addition 1) to generate a current sum Im1 The relay controller 30d adds the transmitted current values Ic and Id (addition 1) to generate a current sum Im2. The relay controllers 30c and 30d transmit the current sums Im1 and Im2 to the relay controller 30a via the communication paths 53.

In the communication period T3, the relay controller 30a adds the transmitted current sums Im1 and Im2 (addition 2) to generate a current sum Im3. The relay controller 30a transmits the current sum Im3 to the main controller 10 via the communication path 52.

The addition 1 illustrated in this drawing can be carried out in a relatively short time period compared to the transmission of the current sum Im1. Therefore, the communication period T2 can have the same length as the communication period T1, The same applies to the communication period T3. The state quantities are similarly transmitted in the communication periods T1, T2 and T3 by the main controller 10, the relay controllers 30b, 30e, and 30f, and the subcontrollers 40e to 40h.

Thus, the relay controllers 30 add up the plurality of state quantities and generate and transmit the state quantity information corresponding to a partial sum of the state quantities of the sum of all state quantities. This reduces the amount of data transmitted via the communication paths 52 and 53. Accordingly, this reduces the time required for each communication period (communication periods T1, T2, and T3) to transmit the state quantities, thus reducing the entire time required for communication of all state quantities.

Subsequently, the main controller 10 generates the voltage command corresponding to the state quantity command. In this drawing, VC represents the voltage command generated by the main controller 10.

In the communication period T4, the main controller 10 transmits the voltage command VC to the relay controller 30a via the communication path 52.

In the communication period T5, the relay controller 30a transmits the voltage command VC to the relay controllers 30c and 30d via the communication paths 53.

In the communication period T6, the relay controllers 30c and 30d transmit the voltage command VC to the subcontrollers 40a to 40d via the communication paths 54. The relay controller 30c transmits the voltage command VC to the subcontrollers 40a and 40b. The relay controller 30d transmits the voltage command VC to the subcontrollers 40c and 40d. The control command is similarly transmitted in the communication periods T4, T5 and T6 by the main controller 10, the relay controllers 30b, 30e, and 30f, and the subcontrollers 40e to 40h.

In the transmission of the state quantity command, the state quantity command (voltage command) generated by the main controller 10 is transmitted (distributed) to the subcontrollers 40 via the relay controllers 30.

Control Method for Current Conversion Device

FIG. 7A illustrates an example of a control method for the main controller according to the first embodiment. This drawing is a flowchart of an example of the control method for the main controller by taking the main controller 10 illustrated in FIG. 3 as an example. First, the main controller 10 acquires a control target (step S101). The main controller 10 then acquires state quantity information (step S102). This can be carried out by acquiring the state quantity information received at the lower-level communication ports 13 and 14. The main controller 10 generates a control command (step S103). The control command generated by the main controller 10 is sent (step S104). The main controller 10 waits until the start of the control cycle (step S105, No). Once the control cycle starts (step S105, Yes), the main controller 10 proceeds to the processing of step S101, A state quantity input start command of the subcontrollers 40, which will be described later, can be applied to start the control cycle.

FIG. 7B illustrates an example of a control method for the relay controllers according to the first embodiment. This drawing is a flowchart of an example of the control method for the relay controllers by taking the relay controller 30 illustrated in FIG. 4 as an example. First, the relay controller 30 determines whether the control command has been acquired (step S111). This can be carried out based on whether the control command has been received from a device on the main controller 10 side in the tree-like connection. If the control command is acquired (step S111 Yes), the acquired control command is sent (step S112). This can be carried out by sending the control command to the devices on the subcontrollers 40 side in the tree-like connection. The process then returns to the processing of step S111. On the other hand, in step S111, if the control command is not acquired (step S111, No), the process proceeds to the processing of step S113.

In step S113, the relay controller 30 determines whether the state information or state quantity information has been acquired (step S113). This can be carried out based on whether the state information or state quantity information has been received from a device on the subcontrollers 40 side in the tree-like connection. If the state information or state quantity information has been acquired (step S113, Yes), the state information is generated based on the state information or state quantity information (step S114). The generated state information is sent (step S115). This can be carried out by sending the generated state information to the device on the main controller 10 side in the tree-like connection. The process then returns to the processing of step S111. In step S113, if the state information or state quantity information has not been acquired (step S113, No), the process returns to the processing of step S111.

FIG. 7C illustrates an example of the control method for the subcontrollers according to the first embodiment. This drawing is a flowchart of the control method for the subcontrollers by taking the subcontroller 40 illustrated in FIG. 2 as an example. First, the subcontroller 40 outputs the state quantity input start command (step S121). This corresponds, for example, to the output of the AD conversion start command of the state quantity (current value) to the current detection unit 44 described in connection with FIG. 2. The subcontroller 40 acquires the control command (step S122). This can be carried out by acquiring the control command received at the upper-level communication port 41. The subcontroller 40 acquires the state quantity (step S123). This can be carried out by the control unit 42 acquiring the state quantity (current value) detected by the current detection unit 44.

Subsequently, the control signal for the electric power conversion unit 4 is generated (step S124). This can be carried out by the drive unit 43 generating the control signal under the control of the control unit 42. The subcontroller 40 sends the control signal (step S125). Thus, the generated control signal is sent to the electric power conversion unit 4. The subcontroller sends the state quantity (step S126). This can be carried out by sending the generated state quantity to the device on the main controller 10 side in the tree-like connection. The subcontroller 40 waits until the end of the control cycle (step S127, No). Once the control cycle ends (step S127, Yes), the subcontroller 40 proceeds to the processing of step S121.

The control cycle here should be set to the control cycle having a time length longer than the required time during which the subcontroller 40 outputs the state quantity input start command, the state quantity acquired (detected) by the subcontroller 40 is transmitted to the main controller 10 via the relay controller 30, the main controller 10 generates the control command based on the received state quantity, the control command is transmitted to the subcontroller 40 via the relay controller 30, and the subcontroller 40 generates the control signal based on the received control command and sends it to the electric power conversion unit 4.

The control cycle may also be the control cycle having a time length longer than the processing time of the controller that takes the longest processing time among the subcontrollers 40, the relay controllers 30, and the main controller 10. In this case, the subcontrollers 40, the relay controllers 30, and the main controller 10 simultaneously carry out the processing illustrated in the flowcharts of FIGS. 7C, 73, and 7A, respectively, in each control cycle. When there are j stages of the relay controller 30 until the subcontroller 40 detects the state quantity, generates the control command based on this state quantity, and sends the control signal based on this control command to the electric power conversion unit 4, the processing takes (2j+2) times the control cycle. However, in this case, the state quantity, the control command, and the control signal are updated for every control cycle.

Thus, the relay controller 30 compresses information of the plurality of state quantities and generates and transmits the state quantity information.

This reduces the amount of data transmitted to the main controller 10 and achieves high-speed transmission of the state quantities.

Second Embodiment

Configuration of Electric Power Conversion Device

FIG. 8 illustrates a configuration example of an electric power conversion device according to a second embodiment. This drawing illustrates a configuration example of the relay controller 30 and the subcontrollers 40 in the lowermost stage of the relay unit 20 of the electric power conversion device 1. The relay controller 30 illustrated in this drawing is different from that of the electric power conversion device 1 illustrated in FIG. 1 in that a plurality of subcontrollers 40 are connected.

The relay controller 30 illustrated in this drawing represents an example in which three subcontrollers 40 are connected in series to the communication paths 54a and 54b which are connected to the lower-level communication ports 33 and 34, respectively. Subcontrollers 40i, 40j, and 40k are connected to the communication path 54a, and subcontrollers 40l, 40m, and 40n are connected to the communication path 54b. The subcontrollers 40i and 40j are connected by a communication path 55a, and the subcontrollers 40j and 40k are connected by a communication path 55c. The subcontrollers 40l and 40m are connected by a communication path 55b, and the subcontrollers 40m and 40n are connected by a communication path 55d. Communication paths capable of serial communication can be used for the communication paths 55a, 55b, 55c, and 55d, similarly to the communication path 54a.

Configuration of Subcontrollers

FIG. 9 illustrates a configuration example of the subcontrollers according to the second embodiment. This drawing is a block diagram illustrating a configuration example of the subcontrollers 40. The subcontroller 40 illustrated in this drawing is different from the subcontroller 40 illustrated in FIG. 2 in that it further includes a lower-level communication port 45.

The lower-level communication port 45 communicates with the subcontroller 40 provided as the lower-level device. The lower-level communication port 45 is connected to another subcontroller 40 via the communication path 55.

The control unit 42 in this drawing receives the control command via the upper-level communication port 41, and transmits the control command to another subcontroller 40 via the lower-level communication port 45. The control unit 42 receives the state quantity via the lower-level communication port 45, and transmits the state quantity to the relay controller 30 or another subcontroller 40 via the upper-level communication port 41.

Each of the plurality of subcontrollers 40 connected in series transmits the state quantity detected by itself to an upper-level device (the relay controller 30 or another subcontroller 40), while relaying the state quantity of the lower-level subcontroller 40.

In the present embodiment, each subcontroller 40 may add up the state quantity or state quantity information received from the lower-level subcontroller 40 and the state quantity detected by itself to generate new state quantity information, and transmit it to the upper-level subcontroller 40 or the relay controller 30.

Another Configuration of Electric Power Conversion Device

FIG. 10 illustrates another configuration example of the electric power conversion device according to the second embodiment. The electric power conversion device 1 illustrated in this drawing is different from the electric power conversion device 1 illustrated in FIG. 8 in that a plurality of subcontrollers 40 are connected via a bus.

In this drawing, the subcontrollers 40i, 40j, and 40k are commonly connected via a bus 56a, and the subcontrollers 40l, 40m, and 40n are commonly connected via a bus 56b. The buses 56a and 56b are connected to the lower-level communication ports 33 and 34, respectively, of the relay controller 30.

In this configuration, each subcontroller occupies the bus in a time-division manner and transmits the state quantity to the relay controller 30. For example, in the bus 56a, the subcontroller 40i transmits the state quantity to the relay controller 30 in the first communication period, the subcontroller 40j transmits the state quantity to the relay controller 30 in the next communication period, and the subcontroller 40k transmits the state quantity to the relay controller 30 in the next communication period.

Thus, by serially connecting the subcontrollers 40, the plurality of subcontrollers 40 can be connected to the last-stage relay controller 30 in the relay unit 20. A degree of freedom can be given to the arrangement of the subcontrollers 40 connected to the electric power conversion device 1. In addition, the subcontrollers 40 can be easily expanded.

Third Embodiment

Configuration of Relay Controllers

FIG. 11A illustrates a configuration example of the relay controller according to a third embodiment. This drawing is a block diagram illustrating a configuration example of the relay controller 30. The relay controller 30 according to the third embodiment is different from the relay controller 30 illustrated in FIG. 4 in that it includes three or more lower-level communication ports 33 and the like. The relay controller 30 illustrated in this drawing includes four lower-level communication ports 33, 34, 35, and 36. The lower-level communication ports 33, 34, 35, and 36 are connected to other relay controllers 30 or subcontrollers 40 via the communication paths 54.

The control unit 32 transmits the control command from the main controller 10 side received at the upper-level communication port 31 to the subcontrollers 40 side via the lower-level communication ports 33, 34, 35, and 36. In addition, the control unit 32 compresses information of the state quantities and state quantity information received at the lower-level communication ports 33, 34, 35, and 36, and transmits the compressed state quantity information to the upper-level communication port 31.

Thus, the relay controller 30 including three or more lower-level communication ports 33 and the like allows more lower-level devices to be connected.

The present embodiment can also connect the plurality of subcontrollers 40 to each of the lower-level communication ports 33 and the like of the relay controller 30 located in the lowermost stage of the relay unit 20, as illustrated in FIG. 8. In this case, the subcontrollers 40 connected to each of the lower-level communication ports 33 and the like can be regarded as one group. Here, assuming that the main controller 10 includes the same number of communication ports 13 and the like as the relay controller 30, the number of lower-level communication ports 33 and the like of the relay controller 30 is i, and the number of stages of the relay controllers 30 in the relay unit 20 is j, the subcontrollers 40 can be divided into n groups as expressed by the following relationship.

$$i^{j-1} < n \leq i^j \quad (1)$$

This assumes that only the relay controllers 30 are connected in a tree-like manner, and the relay controller 30 located in the uppermost stage of the relay unit 20 is connected to one of the lower-level communication ports 13 and the like of the main controller 10. In this case, the main controller 10 may be configured to have one lower-level communication port 13. For example, the one relay controller 30 connected to the lower-level communication port 13 generates the sum of state quantities and sends it to the main controller 10 from the upper-level communication port 31 of the relay controller 30.

By appropriately determining n and i that satisfy the expression (1) in accordance with the actual arrangement or the like of the electric power conversion units 4 and the subcontrollers 40, the number of stages of the relay controllers 30 connected in a tree-like manner can be optimized, and the communication time can be reduced to an optimum length. Since only the relay controllers 30 compress information of the state quantities, the processing of the main controller 10 can be simplified.

Configuration of Main Controller

FIG. 11B illustrates a configuration example of a main controller according to a third embodiment. This drawing is a block diagram illustrating a configuration example of the main controller 10. The main controller 10 according to the third embodiment is different from the main controller 10 illustrated in FIG. 3 in that it includes three or more lower-level communication ports 13 and the like. The main controller 10 illustrated in this drawing includes four lower-level communication ports 13, 14, 15, and 16, similarly to the relay controller 30 illustrated in FIG. 11A. These lower-level communication ports 13 and the like are connected to the relay controllers 30 via the communication paths 52.

As described above, when generating the control command, the main controller 10 illustrated in this drawing adds up the state quantity information received at the lower-level communication ports 13, 14, 15 and 16. This corresponds to the main controller 10 carrying out the final information compression of the state quantity information. In this case, the main controller and the plurality of relay controllers 30 can be regarded as being connected in a tree-like manner. Here, n and i satisfying the expression (1) can also be appropriately determined. For example, in FIG. 1, j can be set to 3 (three stages) by setting i to 2 and n to 8. This reduced the number of stages of the relay controllers 30 connected in a tree-like manner compared to the case in which the compression of the information is carried out by only the relay controllers 30.

As described above, the communication time of the state quantities can be optimized by appropriately selecting the number of lower-level communication ports of the relay controllers 30, or the relay controllers 30 and the main controller 10, and the number of groups n of the subcontrollers 40.

Although the electric power conversion device 1 has been configured with the outputs of the plurality of electric power conversion units 4 connected in parallel, the configuration is not limited to this example. For example, the electric power conversion device 1 may be configured with the outputs of the plurality of electric power conversion units 4 connected in series. In that case, the subcontrollers 40 detect voltage values output from the electric power conversion units 4 as the state quantities, and the relay controllers 30 generate and transmit the state quantity information as partial sums of these voltage values. The main controller 10 generates the control command that is the output voltage command of the electric power conversion device 1 based on the difference between the control target, which is the target value of the output voltage of the electric power conversion device 1, and the sum of the output voltages of the electric power conversion units 4.

The electric power conversion device 1 has been described as the control device that drives the motor, but is not limited to this example. For example, various power supply devices that supply power to a load other than the motor 2 may be used. Also, a power conditioner exchanging power between the power generation device using natural energy, such as photovoltaic device or wind power generation device, and the power grid can be used.

The effects described herein are illustrative only and are not limited, and there may be other effects as well.

REFERENCE SIGNS LIST

1 Electric power conversion device
2 Motor
3 Sensor unit
4 Electric power conversion unit
10 Main controller
11, 31, 41 Upper-level communication port
12, 32, 42 Control unit
13, 14, 33, 34, 45 Lower-level communication port
20 Relay unit
30a, 30b, 30c, 30d, 30e, 30f Relay controller
40, 40a, 40b, 40c, 40d, 40e, 40f, 40g, 40h, 40i, 40j, 40k 40l 40m 40n Subcontroller
43 Drive unit
44 Current detection unit
51, 52, 52a, 52b, 53a, 53b, 54a, 54b, 55a, 55b, 55c, 55d Communication path
56a, 56b Bus

The invention claimed is:

1. An electric power conversion device, comprising:
a main controller configured to generate and output a control command that is a target value for controlling electric power conversion carried out by a plurality of electric power conversion units that supply and receive power to and from a load based on state quantity information related to a state quantity of each of the plurality of electric power conversion units;
a plurality of subcontrollers provided for each of the electric power conversion units to control the electric power conversion units based on the control command and to acquire and output the state quantities; and
a relay unit configured to compress information of the state quantities output from the plurality of subcontrollers to generate the state quantity information, and transmit the state quantity information to a main controller side, wherein
the relay unit includes a plurality of relay controllers, and each of the relay controllers includes:
an upper-level communication port connected to an upper-level communication path connected to the main controller side; and
a plurality of lower-level communication ports each connected to a lower-level communication path connected to a subcontroller side.

2. The electric power conversion device according to claim 1, wherein the relay controllers are connected in a tree-like manner in multiple stages.

3. The electric power conversion device according to claim 1, wherein
the main controller generates the control command based on a sum of the state quantities of the plurality of electric power conversion units, and the state quantity information is the sum of the state quantities output from two or more of the subcontrollers.

4. The electric power conversion device according to claim 1, wherein the acquisition of the state quantities in the subcontrollers includes acquisition of the state quantities by converting the state quantities detected as analog quantities into digital quantities.

5. The electric power conversion device according to claim 1, wherein the plurality of subcontrollers are connected in series with the relay controllers.

6. The electric power conversion device according to claim 5, wherein
the plurality of relay controllers are connected in a tree-like manner in j stages, each of the relay controllers including one upper-level communication port and i lower-level communication ports, and
the plurality of subcontrollers are divided into n groups, where the number of groups, n, satisfies $i^{j-1} < n \leq i^j$.

7. The electric power conversion device according to claim 6, wherein the main controller includes the i lower-level communication ports, and is connected with the plurality of relay controllers in a tree-like manner in the j stages via the i lower-level communication ports.

8. The electric power conversion device according to claim 1, wherein the relay unit is communicatively connected to the main controller and the subcontrollers in a serial communication manner.

9. The electric power conversion device according to claim 1, wherein the main controller generates and outputs one control command.

10. The electric power conversion device according to claim 1, wherein
each of the plurality of subcontrollers further outputs a status which is information of itself, and
the relay unit further transmits a status obtained by aggregating the statuses output from the plurality of subcontrollers to the main controller side.

11. A control method for an electric power conversion device, comprising:
generating and outputting, by a main controller, a control command that is a target value for controlling electric power conversion carried out by a plurality of electric power conversion units that supply and receive power to and from a load using state quantity information related to a state quantity of each of the plurality of electric power conversion units;
controlling, by a plurality of subcontrollers, the electric power conversion units based on the control command for each of the electric power conversion units, and acquiring and outputting the state quantities;
obtaining, by each of a plurality of relay controllers in a relay unit, information of a plurality of the output state quantities from a plurality of lower-level communication ports, wherein each of the plurality of lower-level communication ports is connected to a lower-level communication path connected to a subcontroller side;
compressing the information of the plurality of the output state quantities to generate the state quantity information;
transmitting the state quantity information from an upper-level communication port, wherein the upper-level communication port is connected to an upper-level communication path connected to a main controller side; and using, by the main controller, the state quantity information for the generation of the control command.

\* \* \* \* \*